United States Patent [19]

Doki et al.

[11] Patent Number: 5,627,249
[45] Date of Patent: May 6, 1997

[54] ACRYLAMIDE POLYMERS AND USE THEREOF

[75] Inventors: Hirotoshi Doki; Hitoshi Ishigaki; Toshiki Oyanagi; Tsugio Matsubara, all of Yokoyama; Shigeo Watanabe, Mobara, all of Japan

[73] Assignee: Mitsui Toatsu Chemicals, Incorporated, Tokyo, Japan

[21] Appl. No.: 363,268

[22] Filed: Dec. 23, 1994

[30] Foreign Application Priority Data

Dec. 24, 1993 [JP] Japan .................... 5-326553
May 13, 1994 [JP] Japan .................... 6-100038
Jun. 14, 1994 [JP] Japan .................... 6-131664
Jun. 19, 1994 [JP] Japan .................... 6-138733

[51] Int. Cl.$^6$ .................... C08F 220/56; C08F 228/02
[52] U.S. Cl. .................... 526/303.1; 526/287
[58] Field of Search .................... 526/303.1, 287

[56] References Cited

U.S. PATENT DOCUMENTS 4,361,452  11/1982  Clarke et al. .................... 156/71
4,451,628   5/1984  Dammann .................... 526/225

FOREIGN PATENT DOCUMENTS 0376758  7/1990  European Pat. Off. .

*Primary Examiner*—Joseph L. Schofer
*Assistant Examiner*—Wu C. Cheng
*Attorney, Agent, or Firm*—Oblon, Spivak, McClelland, Maier & Neustadt, P.C.

[57] ABSTRACT

Provided by this invention are an acrylamide polymer which has a weight-average molecular weight (a) of from 1,500,000 to 10,000,000 and a weight-average inertial radius (b) of from 30 to 150 nm, the ratio (b)/(a) of the weight-average inertial radius (b) to the weight-average molecular weight (a) being 0.00004 or smaller; and an aqueous solution of an acrylamide polymer which solution has a polymer concentration ranging from 22 to 60%, a Brookfield viscosity at 25° C. of 50,000 cps or smaller and a weight-average molecular weight of from 500,000 to 10,000,000. They are useful as paper strength agents.

6 Claims, No Drawings

ACRYLAMIDE POLYMERS AND USE THEREOF

BACKGROUND OF THE INVENTION a) Field of the Invention

This inventions relates to acrylamide polymers and aqueous solutions thereof, which are useful in papermaking industry, the field of effluent treatment, the field of civil engineering and construction, and the like. Specifically, the present invention is concerned with acrylamide polymers having a controlled branched and crosslinked structure. The acrylamide polymers according to the present invention are particularly useful in the field of papermaking industry as paper strength agents excellent in paper reinforcing effects.

b) Description of the Related Art

Acrylamide polymers have been used for various applications to date. Specifically, paper strength agents, drainage agents, retention aids, coagulants, secondary oil recovering agents, dispersants, etc. In these applications, various acrylamide polymers whose weight average molecular weights range from about 100,000 to somewhat greater than 20,000,000 are chosen depending on the application purposes, and those having a linear molecular structure have been used primarily.

In recent years, it has been attempted to improve the performance of acrylamide polymers in the field of papermaking industry, such as paper strength agents, by allowing them to have a partially-crosslinked structure and a partially-branched structure so that their molecular weights can be increased while suppressing a viscosity increase in their solutions.

There is, for example, a technique in which a vinyl monomer having two or more double bonds in a 10 molecule is used as a crosslinking agent. Specific known examples of the vinyl monomer include divinyl monomers such as methylenebisacrylamide, methylenebis-methacrylamide, ethylene glycol diacrylate and ethylene glycol dimethacrylate; and trifunctional monomers such as 1,3,5-triacryloylhexahydro-S-triazine and triallyl isocyanurate. The molecular weight increasing technique, which relies upon these vinyl monomers alone, are however still considered to be insufficient for paper strength agents, because it results in a branched and crosslinked structure substantially lacking uniformity and moreover, increased gelling effects or the like are observed when polyfunctional monomers are used.

It has also been attempted to produce an acrylamide polymer having a branched and crosslinked structure by using a specific compound in combination with such a crosslinking agent. Known combinations include, for example, the combinations of crosslinking agents and primary amines or OH-containing monomers, the combinations of crosslinking agents and specific hydrophobic monomers, and the combinations of crosslinking agents and itaconic acid derivatives. Although it is said that these combinations can all achieve an increase in molecular weight while maintaining the viscosity low but in view of the structures of the resulting polymers, they are not sufficient as paper strength agents and their effects are still insufficient.

To produce acrylamide polymers having a branched and crosslinked structure, attempts have also been made using means other than the above-described branching and crosslinking method which relies upon copolymerization making use of a polyfunctional vinyl monomer. As one example of this approach, a papermaking additive has been proposed, which uses a reaction between a specific N-substituted acrylamide derivative such as N,N-dimethylacrylamide and a persulfate- or peroxide-base catalyst. This method is said to permit an increase in molecular weight while maintaining the viscosity low but, because of occurrence of polymer degradations, the resulting polymer is not sufficient in view of its structure and is not considered to exhibit sufficient effects as a paper strength agent.

The conventional acrylamide polymers produced by these conventional techniques are generally used as aqueous solutions for the above-described applications. Processes have been proposed for the production of an acrylamide polymer which has a molecular weight of about 3,000,000 or so and can be formed into an 15% aqueous solution. No acrylamide polymer solution having a high concentration is however known at all. The concentration is as low as 15% to 21% at most, because a linear acrylamide polymer which may be formed into an aqueous solution having a concentration higher than the above level does not have such a high molecular weight as desired or the solution so formed has a very high viscosity. In addition, any attempt to introduce a branched and crosslinked structure into an acrylamide polymer causes a crosslinking reaction to locally proceed to a considerable extent so that, coupled with the high concentration, water-insoluble gel is formed or the resulting mixture is gelated entirely and the resulting acrylamide polymer cannot be obtained in the form of an aqueous solution. The acrylamide polymer is therefore not usable as a paper strength agent.

An application for patent was filed in Japan on a surface strength agent composed of an aqueous solution of a polyacrylamide polymer, which has a viscosity of 500–5,000 cps and a concentration of 10–30%. The application was published under Japanese Patent Laid-Open No. 279491/1991. Although a molecular weight range of 100,000 to 3,000,000 is referred to in its specification, there is no specific disclosure as to the possibility that the process disclosed therein may achieve a molecular weight increase to a level as high as 500,000 or greater in terms of absolute molecular weight while permitting a concentration of 22% or higher.

Despite a merit available in shipping cost from a higher polymer concentration, no aqueous solution containing a high molecular weight acrylamide polymer at a concentration of 22% or higher was known at all to date for the reasons described above.

SUMMARY OF THE INVENTION

An object of the present invention is to provide an aqueous solution of an acrylamide polymer having novel physical properties unknown in the conventional art, specifically, an aqueous solution of an acrylamide polymer, said solution having a relatively low viscosity at a high concentration despite a high molecular weight of the acrylamide polymer, and also a process for the preparation of the aqueous solution.

Another object of the present invention is to provide an acrylamide polymer having a novel structure unknown in the above-described conventional art.

A further object of the present invention is to provide a paper strength agent comprising said acrylamide polymer.

With the foregoing circumstances in view, the present inventors have proceeded with an extensive investigation on the polymerization of acrylamide polymers. This investigation has now resulted in the provision of an aqueous polymer solution which still has a low viscosity although the solution and the polymer have such a high polymer concentration and high molecular weight as unavailable to date.

In one aspect of the present invention, there is thus provided an acrylamide polymer having (a) a weight-average molecular weight of from 1,500,000 to 10,000,000 and (b) a weight-average root mean square radius of from 30 to 150 nm, the ratio (b)/(a) of the weight-average root mean square radius to the weight-average molecular weight being 0.00004 or smaller.

The acrylamide polymer can preferably have (c) a number-average molecular weight of from 400,000 to 5,000,000, the ratio (a)/(c) of the weight-average molecular weight to the number-average molecular weight being 6 or smaller.

In another aspect of the present invention, there is also provided an aqueous solution of an acrylamide polymer, which has a polymer concentration ranging from 22 to 60%, a Brookfield viscosity at 25° C. of 50,000 cps or smaller and a weight-average molecular weight of from 500,000 to 10,000,000.

In a further aspect of the present invention, there is also provided as a preferred embodiment a paper strength agent comprising a water-soluble polymer obtained by polymerizing the following components:

(a) from 94 to 99.98 mole % of (meth)acrylamide;

(b) from 0.01 to 1 mole % of a crosslinking monomer; and (c) from 0.01 to 5 mole % of one or more of vinyl compounds and/or salts thereof, said vinyl compounds being represented by the following formula (1):

wherein R represents a hydrogen atom or a $C_{1-3}$ lower alkyl group and n stands for an integer of from 1 to 4.

In necessary, 0.01–20 mole % of the (meth)acrylamide (a) can be replaced by the same molar amount of one or more of vinyl compounds and/or salts thereof copolymerizable with the crosslinking monomer.

DETAILED DESCRIPTION OF THE INVENTION

The term "acrylamide polymer" as used herein means a polymer formed from acrylamide and/or methacrylamide or an acrylamide copolymer containing acrylamide and/or methacrylamide as a predominant component among all monomers making up the copolymer. When employed as a paper strength agent, however, the acrylamide polymer preferably contains acrylamide and/or methacrylamide in a proportion of 50 mole % or more, preferably 74–99.97 mole %, and especially 94–99.98 mole %.

The term "weight average molecular weight (a)" as used herein can be determined by the static light scattering method. Specifically, its value can be obtained by using a multi-angle light scattering detector and then preparing a Zimm plot or the like. As an alternative, it can also be obtained by preparing a Debye plot in accordance with the GPC-MALLS method while using a gel permeation chromatograph (GPC) equipped with a multi-angle laser light scattering detector connected thereto.

Further, the weight average root mean square radius (b) is measured by the GPC-MALLS method referred to above.

In general, the following fundamental formula of light scattering is used for the measurement of a molecular weight by the light scattering method.

$$Kc/R(\theta)=1/M_wP(\theta)+2A_2c+\ldots$$

where $R(\theta)$: The excess Rayleigh ratio of light scattered at the angle ($\theta$);

c: Concentration of the sample;

Mw: Weight average molecular weight;

$A_2$: Second virial coefficient;

K: Optical parameter; and $P(\theta)$: Normalized intensity distribution function.

The term "weight average molecular weight (a)" as used herein means a value obtained by ignoring the second and higher terms, which represent the second virial coefficient, like the GPC-LALLS method which is conducted using a GPC and a low-angle laser light scattering detector connected thereto.

Further, the term "weight average root mean square radius (b)" as used herein is generally expressed by $<S^2>^{1/2}$.

To ascertain the average crosslinking degree of a polymer, it is important to find out the relationship between its weight average molecular weight and its molecular size (e.g., root mean square radius or the like). It is generally known that, where polymers have the same composition and the same molecular weight, the molecular size becomes smaller as the crosslinking degree becomes greater. Accordingly, when the weight average root mean square radius (b) and the weight average molecular weight (a) are specified, their ratio (b)/(a) can be used as an index showing an average crosslinking degree.

The weight average molecular weight (a) and weight average root mean square radius (b) of the acrylamide polymer according to the present invention are 1,500,000–10,000,000 and 30–150 nm, respectively, and the (b)/(a) ratio is 0.00004 or smaller. In view of the preference toward a uniform branched and crosslinked structure, the preferred weight average molecular weight (a) and weight average inertial radius (b) can be 2,000,000–8,000,000 and 40–120 nm, respectively, and the preferred (b)/(a) ratio can be 0.000035 or smaller. A more preferable (b)/(a) ratio is 0.00003 or smaller.

The preferred number average molecular weight (c) of the acrylamide polymer according to this invention can be 400,000–5,000,000, and the preferred ratio of its weight average molecular weight (a) to (c), that is, the preferred (a)/(c) ratio can be 6 or smaller. In view of the preference toward a uniform branched and crosslinked structure, the more preferred number average molecular weight (c) can be 500,000–3,000,000, and the more preferred (a)/(c) ratio can be 4 or smaller. Incidentally, the number average molecular weight (c) described above means an absolute number average molecular weight, which can be measured by the GPC-MALLS method. The ratio of the weight average molecular weight (a) to the number average molecular weight (c), that is, the (a)/(c) ratio shows the molecular weight distribution of the polymer.

In the acrylamide polymer according to the present invention, molecules having a molecular weight of 1,000,000 or greater can preferably amount to 40 wt. % or more. In view of the preference toward a uniform branched and crosslinked structure, such molecules can more preferably amount to 50 wt. % or more, with 60 wt. % or more being particularly preferred. The term "molecular weight" as used here means an absolute molecular weight measured by the GPC-MALLS method and can be obtained from a distribution curve of absolute molecular weights by the GPC-MALLS method.

Values of the polymer, such as its molecular weight and root mean square radius, by the above-described light scattering method can be measured using as a solvent (or an eluent) a $\frac{1}{15}$N phosphate buffer (pH 7) which contains $\frac{1}{10}$N of sodium nitrate.

In the acrylamide polymer according to the present invention, the hydrated diameter by the dynamic light scattering method can preferably be 50–300 nm, with 70–300 nm being more preferred. The hydrated diameter by the dynamic light scattering method means a hydrodynamic diameter available in accordance with the Einstein-Stokes' equation and is a value obtained by measuring the polymer at a 0.1% concentration, a scattering angle of 90° and 20° C. while using as a solvent (or an eluent) a 1/15N phosphate buffer (pH 7) containing 1/10N of sodium nitrate. Described specifically, it can be measured by an instrument such and a "Submicron Particle Analyzer Model N4" manufactured by Coulter Inc. In this instrument, analysis of data so obtained is performed by SDP analysis making use of the program "CONTIN".

An aqueous solution of the acrylamide polymer according to the present invention can have a Brookfield viscosity of 20–10,000 cps/25° C. at 10% polymer concentration or a Brookfield viscosity of 100–30,000 cps/25° C. or preferably of 300–20,000 cps/25° C. at 15% polymer concentration.

Examples of the acrylamide polymer according to this invention include those obtained by copolymerizing acrylamide or methacrylamide with one or more of compounds or salts thereof, said compounds being 5 represented by the following formula (1):

$$\begin{array}{c} CH_2=C-R \\ | \\ (CH_2)_n-SO_3H \end{array} \quad (1)$$

wherein R represents a hydrogen atom or a lower alkyl group and n stands for an integer of from 1 to 8.

In the formula (1), the lower alkyl group is preferably a $C_{1-3}$ lower alkyl group, and specifically a methyl, ethyl, n-propyl or i-propyl group. Examples of the salts include the salts of alkali metals such as sodium and potassium, and the ammonium salt. Specific examples of sulfonic acid compounds represented by the formula (1) include allylsulfonic acid, sodium allylsulfonate, methallylsulfonic acid, sodium methallylsulfonate, and ammonium methallylsulfonate.

The amount of the sulfonic acid or the salt thereof can amount to 0.005–30 mole % based on all the monomers making up the acrylamide polymer. In view of the preference toward a uniform branched and cross-linked structure, however, it can amount preferably to 0.01–20 mole %, more preferably 0.05–10 mole %. When employed as an internal paper strength agent, the sulfonic acid or salt thereof can preferably amount to 0.01–5 mole %, most preferably 0.05–5 mole %. These compounds can be used either singly or in combination.

Incidentally, with respect to mathallylsulfonic acid and salts thereof, their effects as molecular weight modifiers upon polymerization of acrylamide are disclosed in U.S. Pat. No. 4,451,628. The process disclosed in this patent however merely indicates the possibility of provision of an acrylamide polymer of low molecular weight, and the polymer so obtained is totally different from a polymer which is available in accordance with the present invention and has a controlled, branched and crosslinked structure.

Further, use of a crosslinkable monomer in addition to the compound represented by the formula (1) makes it possible to more easily obtain the acrylamide polymer of this invention.

Specific examples of such crosslinkable monomers include bifunctional crosslinkable monomers such as methylenebisacrylamide, methylenebismethacrylamide, ethylenebisacrylamide, ethylenebismethacrylamide, ethylene glycol diacrylate, ethylene glycol dimethacrylate, diethylene glycol diacrylate, diethylene glycol dimethacrylate, triethylene glycol diacrylate, triethylene glycol dimethacrylate, divinylbenzene and diallylacrylamide; and polyfunctional crosslinkable monomers such as 1,3,5-triacryloylhexahydro-S-triazine, triallyl isocyanurate, triacrylic pentaerythritol, trimethylolpropane acrylate, and triacrylformal, diacryloylimide. Such a crosslinkable monomer may preferably amount to 0.005–5 mole % of the total amount of all the monomers making up the acrylamide polymer. In view of the preference toward a uniform branched and crosslinked structure, 0.01–2 mole % is more preferred, with 0.01–1 mole % being most preferred. These compounds can be used either singly or in combination.

The acrylamide polymer according to this invention can also be produced by copolymerizing one or more various vinyl monomers in addition to acrylamide and/or methacrylamide. Examples of such vinyl polymers include ionic monomers, hydrophilic monomers and hydrophobic monomers.

Among ionic monomers, exemplary anionic monomers include unsaturated carboxylic acids such as acrylic acid, methacrylic acid, itaconic acid, maleic acid and fumaric acid, and salts thereof; and vinylsulfonic acid, styrenesulfonic acid and acrylamidomethylpropanesulfonic acid, and salts thereof.

Illustrative examples of cationic monomers include amines such as N,N-dimethylaminoethyl methacrylate, N,N-diethylaminoethyl methacrylate, N,N-dimethylaminoethyl acrylate, N,N-dimethylaminopropyl methacrylamide, and N,N-dimethylaminopropylacrylamide; and salts thereof (including quaternary salts).

Illustrative examples of hydrophilic monomers include acetoneacrylamide, N,N-dimethylacrylamide, N,N-dimethylmethacrylamide, N-ethylmethacrylamide, N-ethylacrylamide, N,N-diethylacrylamide, N-propylacrylamide, N-acryloylpyrrolidine, N-acryloylpiperidine, N-acryloylmorpholine, hydroxyethyl methacrylate, hydroxyethyl acrylate, hydroxypropyl methacrylate, hydroxypropyl acrylate, various methoxypolyethylene glycol (meth)acrylates, and N-vinyl-2-pyrrolidone.

Exemplary hydrophobic monomers include N-alkyl (meth)acrylamide derivatives such as N,N-di-n-propylacrylamide, N-n-butylacrylamide, N-n-hexylacrylamide, N-n-hexylmethacrylamide, N-n-octylacrylamide, N-n-octylmethacrylamide, N-tert-octylacrylamide, N-dodecylacrylamide, and N-n-dodecylmethacylamide; N-(ω-glycidoxyalkyl) (meth) acrylamide derivatives such as N,N-diglycidylacrylamide, N,N-diglycidylmethacrylamide, N-(4-glycidoxybutyl) acrylamide, N-(4-glycidoxybutyl)methacrylamide, N-(5-glycidoxypentyl)acrylamide, and N(6-glycidoxyhexyl) acrylamide; (meth)acrylate derivatives such as methyl (meth)acrylate, ethyl (meth)-acrylate, butyl (meth)acrylate, lauryl (meth)acrylate, 2-ethylhexyl (meth)acrylate, and glycidyl (meth)acrylate; olefins such as acrylonitrile, methacrylonitrile, vinyl acetate, vinyl chloride, vinylidene chloride, ethylene, propylene, and butene; styrene; α-methylstyrene; butadiene; and isoprene.

Such vinyl monomers to be copolymerized can be used generally in a range of 0–50 mole %, although this amount varies depending on the kind and combination of the monomers and cannot be defined in a wholesale manner. When the acrylamide polymer is used as a paper strength agent, it is optimal to use an anionic monomer preferably in an amount of 0–20 mole %, more preferably in an amount of 0.5–10 mole % and also a cationic monomer preferably in an amount of 0–20 mole %, more preferably 5–10 mole %.

As a polymerization process for the acrylamide polymer in the present invention, radical polymerization is preferred.

As a polymerization solvent, a polar solvent such as water, an alcohol or dimethylformamide is preferred. Aqueous solution polymerization is however preferred when the acrylamide polymer is used as a paper strength agent. In the case of aqueous water polymerization, an organic solvent such as an alcohol can be used in combination to such an extent that the dispersibility would not be impaired by deposition or precipitation of the polymer.

The polymerization of the acrylamide polymer in the present invention can be conducted by such a batch process that all the monomers are charged at once in a reaction vessel and are then polymerized. To obtain an aqueous solution having a high concentration of 22% or more, it is however more desired to conduct the polymerization by such a semi-batch process that the polymerization is conducted while adding dropwise a portion of or the entire portion of the monomers. This semi-batch polymerization process makes it possible not only to facilitate removal of polymerization heat from a solution containing monomers at high concentrations but also to control the molecular structure, for example, to facilitate the formation of the polymer into a uniform branched and crosslinked structure.

No particular limitation is imposed on the polymerization concentration, which is defined by the concentration of monomers and a polymer at the time of polymerization. The polymerization concentration is generally 2–40 wt. %, preferably 5–40 wt. %. To form an aqueous solution having a high concentration of 22% or more, however, the polymerization concentration can preferably be set as will be described hereinafter.

In batchwise polymerization, the polymerization concentration is generally 22–40 wt. %. Although it is possible to conduct polymerization at a concentration lower than 22 wt. % and to convert the resultant polymerization reaction mixture into an aqueous polymer solution having a concentration of 22% or higher by concentration, this is disadvantageous from the standpoint of economy. In semi-batch polymerization, the polymerization concentration in a reaction vessel to which reactants are being added dropwise can be set at a desired level by adjusting the initial monomer concentration in the reaction vessel and also the dropping rates of the monomers. The polymerization concentration at the time of completion of the dropwise addition is however approximately 20–60 wt. %. In this case, it is also possible, like the batchwise polymerization, to conduct polymerization at a concentration lower than 22 wt. % and then to convert the resultant polymerization reaction mixture into an aqueous polymer solution having a concentration of 22% or higher by concentration. This however involves such a disadvantage as described above.

No particular limitation is imposed on the polymerization initiator. A water-soluble polymerization initiator is preferred. The polymerization initiator can be added either at once or dropwise to the aqueous solution of the monomers. Specific examples of the polymerization initiator include, as persulfate and peroxide types, ammonium persulfate, potassium persulfate, sodium persulfate, hydrogen peroxide, benzoyl peroxide and tert-butyl peroxide. It is preferred to use such polymerization initiators singly, but they can also be combined with a reducing agent for use as redox polymerization catalysts. Illustrative examples of the reducing agent include sulfites; bisulfites; low-degree ionization salts such as iron, copper and cobalt salts; organic amines such as N,N,N',N'-tetramethylethylenediamine; and reducing sugars such as aldose and ketose.

An azo compound is also one of most preferred initiators for use in the present invention. Usable exemplary azo compounds include 2,2'-azobis-2-methylpropionamidine hydrochloride, 2,2'-azobis-2,4-dimethylvaleronitrile, 2,2'-azobis-N,N'-dimethyleneisobutylamidine hydrochloride, 2,2'-azobis-2-methyl-N-(2-hydroxyethyl)-propionamide, 2,2'-azobis-2-(2-imidazolin-2-yl)propane and salts thereof, and 4,4'-azobis-4-cyanovaleric acid and salts thereof. Two or more of the above-described polymerization initiators can be used in combination. The amount of the polymerization initiator is generally 0.001–5 wt. % based on the monomers.

The polymerization temperature generally ranges from 30° C. to 90° C. where a single polymerization initiator is used. The initiation temperature in the case of a redox polymerization initiator is lower and is generally 5°–50° C. It is unnecessary to maintain the temperature at the same level during the polymerization. The polymerization temperature can be changed as needed as the polymerization proceeds. Since the temperature generally tends to arise due to heat of polymerization which is produced as the polymerization proceeds, it may become necessary to cool the polymerization vessel as needed. Although no particular limitation is imposed on the internal atmosphere of the polymerization vessel in this case, it is desired to purge the internal atmosphere with inert gas such as nitrogen gas if one wants to make the polymerization proceed quicker. No particular limitation is imposed on the polymerization time but, including the time of the dropwise addition in semi-batch polymerization, the polymerization time is generally 1–20 hours. Although no particular limitation is imposed on the polymerization pH, the polymerization can be conducted by adjusting the pH as needed. Examples of pH modifiers include alkalizing agents such as sodium hydroxide, potassium hydroxide and ammonia; mineral acids such as phosphoric acid, sulfuric acid and hydrochloric acid; and organic acids such as formic acid and acetic acid.

The present invention can provide an aqueous solution of an acrylamide polymer having a Brookfield viscosity at 25° C. of 50,000 cps or lower and a weight average molecular weight of 500,000–10,000,000 while permitting a concentration in a range as high as 22–60%, notably 30–60%. From the standpoint of uniformity in the branched and crosslinked structure, the preferred concentration and molecular weight are, for example, in their respective ranges not inconvenient for the application of the aqueous solution as a paper strength agent, generally 500,000–8,000,000 at 25% concentration, 500,000–6,000,000 at 30% concentration, 500,000–4,000,000 at 40% concentration, and 500,000–3,000,000 at 50% concentration.

Incidentally, the polymer concentration of an aqueous polymer solution can be determined by measuring its oven-dry polymer concentration. Illustrative measuring methods include the hot-air drying method and the ket method.

The polymers and aqueous solutions so obtained can exhibit various excellent effects as paper strength agents. Use of the acrylamide polymers according to the present invention as paper strength agents will be described in further detail.

Paper strength agents can be divided into two groups, one being used by adding the same into a pulp slurry and the other being employed by either coating or impregnating a paper sheet with the same subsequent to removal of water from the paper sheet by a wire. The acrylamide polymers according to the present invention can be used in either ways.

Each paper strength agent according to the present invention can be used generally in a manner to be described hereinafter. Into a pulp slurry, it is added optionally together with a fixing agent such as aluminum sulfate. In this case, the paper strength agent is used approximately in an amount of 0.05–3% based on the solid content of the pulp slurry. When it is used as an external addition type, it is used in a similar amount by sizepress coating or calender coating.

When an aqueous acrylamide polymer solution whose concentration is 22% or higher is used as a paper strength agent, the acrylamide polymer preferably has a weight average molecular weight of 500,000–10,000,000. A higher polymer concentration is obviously preferred from the economical standpoint too, but the viscosity is 50,000 cps or lower and from the standpoint of handling or workability during shipping or use, the preferred viscosity is 30,000 cps or lower, with a range not higher than 20,000 being more preferred.

Incidentally, the aqueous polymer solution is used by diluting it as needed.

It is not certain at this moment for what reasons the acrylamide polymers having such novel structure and physical properties and their aqueous solutions have been obtained by the process of the present invention. It is gathered that in the course of the polymerization of the compound represented by the formula (1) or (2), the resultant polymer would undergo a specific reaction with radicals in another polymer or with pendant double bonds derived from the crosslinkable monomer to permit an efficient progress of branching and crosslinking, thereby making it possible to obtain an acrylamide polymer having a still more uniform branched and cross-linked structure compare with the acrylamide polymers known to date. It is also estimated that, owing to the uniform branched and crosslinked structure of the polymer, the number of points of bonding between pulp fibers would have been indirectly increased and the polymer would hence exhibit various performances as an excellent paper strength agent.

The present invention will hereinafter be described in further detail by Examples. It should however be borne in mind that this invention is by no means limited to or by the examples. Incidentally, all designations of "%" mean wt. % unless otherwise specifically designated.

Measurements by GPC-MALLS in the examples were conducted under the following conditions:

GPC apparatus: "SYSTEM 11" (trade name), manufactured by Showa Denko K. K.
Column: "SHODEX SB 80M" (trade name)
Eluent: N/15 phosphate buffer solution (pH 7) containing N/10 sodium nitrate
Flow rate: 1.0 ml/min
Detector: "DAWN" (trade name), a multi-angle laser light scattering detector manufactured by Wyatt Technology.

EXAMPLE 1

In a five-necked flask (hereinafter called "reaction vessel") equipped with a stirrer, a reflux condenser, a thermometer, a nitrogen inlet tube and a dropping funnel, 500 g of purified water were charged. While nitrogen gas was blown into the flask, the internal temperature was adjusted to 80° C.

On the other hand, a mixed solution of 0.308 g of methylene bisacrylamide and 0.632 g of sodium methallylsulfonate in 354.3 g of a 40% aqueous solution of acrylamide and 60 g of an aqueous solution in which 0.18 g of 4,4'-azobis-4-cyanovaleric acid having a purity of 84% had been dissolved were prepared, respectively. They were added dropwise to the reaction vessel at constant rates over 130 minutes, respectively. In the course of the dropwise addition, the internal temperature of the reaction vessel was maintained at 80° C. After the completion of the dropwise addition, polymerization was continued for 3 hours at 80° C. Water was then added to the reaction vessel and the reaction vessel was then cooled to terminate the reaction, thereby obtaining an aqueous solution of an acrylamide polymer having a Brookfield viscosity at 25° C. of 18,000 cps when the solution had a nonvolatile content of 15% and a Brookfield viscosity at 25° C. of 1,780 cps when the solution had a nonvolatile content of 10%. The polymer so obtained is designated as "A-1". As a result of measurement of a weight-average molecular weight (a) and a weight-average root mean square radius (b) of "A-1" by the GPC-MALLS method, they were found to be 3,050,000 and 73.8 nm, respectively. The ratio of (b) to (a) was 0.0000242. In addition, it was found according to the above method that its absolute-number-average molecular weight (c) was 1,250,000, thereby giving an (a)/(c) ratio of 2.44. Further, when the weight percentage (d) of molecular weights of 1,000,000 and higher was determined from a molecular weight distribution curve, it was found to be 73.5%. A hydrated radius (e) was also measured using an N-4 type submicron particle analyzer manufactured by Coulter Inc. As a result, it was found to be 120 nm.

EXAMPLE 2

In the reaction vessel, 560 g of purified water were charged. While nitrogen gas was blown into the vessel, the internal temperature was adjusted to 80° C.

In 354.1 g of a 40% aqueous solution of acrylamide, 1.23 g of methylene bisacrylamide, 0.79 g of sodium methallylsulfonate and 0.9 g of 4,4'-azobis-4-cyanovaleric acid of 84% purity were mixed and dissolved to prepare a mixed monomer-initiator solution.

The mixed monomer-initiator solution so obtained was added dropwise to the reaction vessel at a constant rate over 150 minutes. In the course of the dropwise addition, the internal temperature of the reaction vessel was maintained at 80° C. The temperature of the mixed monomer-initiator solution was, on the other hand, maintained at 20° C. or lower so that the polymerization did not occur before the dropwise addition.

After the completion of the dropwise addition, polymerization was continued for 3 hours at 80° C. Water was then added to the reaction vessel and the reaction vessel was cooled to terminate the reaction, thereby obtaining an aqueous solution of an acrylamide polymer having a Brookfield viscosity at 25° C. of 2,170 cps when the solution had a nonvolatile content of 15% and having a Brookfield viscosity at 25° C. of 330 cps when the solution had a nonvolatile content of 10%. The polymer so obtained is designated as "A-2". Various physical properties of "A-2" were measured as in Example 1.

EXAMPLE 3

In the reaction vessel, 257.5 g of purified water were charged. While nitrogen gas was blown into the vessel, the internal temperature was adjusted to 80° C.

A mixed solution of 0.585 g of methylene bisacrylamide and 7.865 g of sodium methallylsulfonate in 532.6 g of a 50% aqueous solution of acrylamide and 60 g of an aqueous solution in which 0.38 g of 4,4'-azobis-4-cyanovaleric acid of 84% purity and NaOH in a molar amount twice as much as the molar amount of the 4,4'-azobis-4-cyanovaleric acid had been dissolved were prepared, respectively. Both the solutions were added dropwise to the reaction vessel at constant rates over 150 minutes. In the course of the dropwise addition, the internal temperature was maintained at 80° C.

After the completion of the dropwise addition, polymerization was continued for 3 hours at 80° C. Water was then added to the reaction vessel and the reaction vessel was cooled to terminate the reaction, thereby obtaining an aqueous solution of an acrylamide polymer having a Brookfield viscosity at 25° C. of 630 cps when the solution had a nonvolatile content of 15% and having a Brookfield viscosity at 25° C. of 170 cps when the solution had a nonvolatile content of 10%. The polymer so obtained is designated as "A-3". Various physical properties of "A-3" were measured as in Example 1.

EXAMPLE 4

In the reaction vessel, 177.0 g of purified water were charged. While nitrogen gas was blown into the vessel, the internal temperature was adjusted to 80° C.

In 750.7 g of a 50% aqueous solution of acrylamide, 0.837 g of methylene bisacrylamide, 23.8 g of sodium methallylsulfonate and 0.544 g of 4,4'-azobis-4-cyanovaleric acid of 84% purity were mixed and dissolved to prepare a mixed monomer-initiator solution.

The mixed monomer-initiator solution so obtained was added dropwise to the reaction vessel at a constant rate over 150 minutes. In the course of the dropwise addition, the internal temperature of the reaction vessel was maintained at 80° C. The temperature of the mixed monomer-initiator solution was, on the other hand, maintained at 20° C. or lower so that the polymerization did not occur before the dropwise addition.

After the completion of the dropwise addition, polymerization was continued for 3 hours at 80° C. Water was then added to the reaction vessel and the reaction vessel was cooled to terminate the reaction, thereby obtaining an aqueous solution of an acrylamide polymer having a Brookfield viscosity at 25° C. of 550 cps when the solution had a nonvolatile content of 15% and having a Brookfield viscosity at 25° C. of 150 cps when the solution had a nonvolatile content of 10%. The polymer so obtained is designated as "A-4". Various physical properties of "A-4" were measured as in Example 1.

EXAMPLE 5

In the reaction vessel, 395.8 g of purified water were charged. While nitrogen gas was blown into the vessel, the internal temperature was adjusted to 80° C.

In 339.4 g of a 40% aqueous solution of acrylamide, 4.62 g of methylene bisacrylamide, 9.84 g of sodium methallylsulfonate and 0.9 g of 4,4'-azobis-4-cyanovaleric acid of 84% purity were mixed and dissolved to prepare a mixed monomer-initiator solution.

The mixed monomer-initiator solution so obtained was added dropwise to the reaction vessel at a constant rate over 150 minutes. In the course of the dropwise addition, the internal temperature of the reaction vessel was maintained at 80° C. The temperature of the mixed monomer-initiator solution was, on the other hand, maintained at 20° C. or lower so that the polymerization did not occur before the dropwise addition.

After the completion of the dropwise addition, polymerization was continued for 3 hours at 80° C. Water was then added to the reaction vessel and the reaction vessel was cooled to terminate the reaction, thereby obtaining an aqueous solution of an acrylamide polymer having a Brookfield viscosity at 25° C. of 106 cps when the solution had a nonvolatile content of 15% and having a Brookfield viscosity at 25° C. of 38 cps when the solution had a nonvolatile content of 10%. The polymer so obtained is designated as "A-5". Various physical properties of "A-5" were measured as in Example 1.

COMPARATIVE EXAMPLE 1

In the reaction vessel, 500 g of purified water were charged. While nitrogen gas was blown into the vessel, the internal temperature was adjusted to 80° C.

In 355.4 g of a 40% aqueous solution of acrylamide, 0.9 g of 4,4'-azobis-4-cyanovaleric acid of 84% purity was dissolved. To the resultant solution, 60 g of water were added, whereby a mixed monomer-initiator solution was prepared.

The mixed monomer-initiator solution so obtained was added dropwise to the reaction vessel at a constant rate over 150 minutes. In the course of the dropwise addition, the internal temperature of the reaction vessel was maintained at 80° C. The temperature of the mixed monomer-initiator solution was, on the other hand, maintained at 20° C. or lower so that the polymerization did not occur before the dropwise addition.

After the completion of the dropwise addition, polymerization was continued for 3 hours at 80° C. Water was then added to the reaction vessel and the reaction vessel was cooled to terminate the reaction, thereby obtaining an aqueous solution of an acrylamide polymer having a Brookfield viscosity at 25° C. of 30,000 cps when the solution had a nonvolatile content of 15% and having a Brookfield viscosity at 25° C. of 2,820 cps when the solution had a nonvolatile content of 10%. The polymer so obtained is designated as "C-1". Various physical properties of "C-1" were measured as in Example 1.

COMPARATIVE EXAMPLE 2

In the reaction vessel, 500 g of purified water were charged. While nitrogen gas was blown into the vessel, the internal temperature was adjusted to 80° C.

A solution in which 355.0 g of a 40% aqueous solution of acrylamide and 0.308 g of methylene bisacrylamide were mixed and dissolved, and 60 g of an aqueous solution of 0.18 g of 4,4'-azobis-4-cyanovaleric acid of 84% purity were prepared, respectively. Both the solutions were added dropwise at constant rates to the reaction vessel as in Example 1, but the reaction mixture lost its flowability in the course of the dropwise addition and at last, it gelated. The gelated polymer is designated as "C-2". It was impossible to measure the various properties of "C-2" because further dilution permitted neither dispersion nor dissolution of "C-2".

COMPARATIVE EXAMPLE 3

In the reaction vessel, 500 g of purified water were charged. While nitrogen gas was blown into the vessel, the internal temperature was adjusted to 80° C.

In 355.0 g of a 40% aqueous solution of acrylamide, 0.308 g of methylene bisacrylamide and 0.9 g of 4,4'-azobis-4-cyanovaleric acid of 84% purity were dissolved. To the resultant solution, 60 g of water were added, whereby a mixed monomer-initiator solution was prepared.

The mixed monomer-initiator solution so obtained was added dropwise to the reaction vessel at a constant rate over 150 minutes. In the course of the dropwise addition, the internal temperature of the reaction vessel was maintained at 80° C. The temperature of the mixed monomer-initiator solution was, on the other hand, maintained at 20° C. or lower so that the polymerization did not occur before the dropwise addition.

After the completion of the dropwise addition, polymerization was continued for 3 hours at 80° C. Water was then added to the reaction vessel and the reaction vessel was cooled to terminate the reaction, thereby obtaining an aqueous solution of an acrylamide polymer having a Brookfield viscosity at 25° C. of 15,000 cps when the solution had a nonvolatile content of 15% and having a Brookfield viscosity at 25° C. of 1,400 cps when the solution had a nonvolatile content of 10%. The polymer so obtained is designated as "C-3". Various physical properties of "C-3" were measured as in Example 1.

COMPARATIVE EXAMPLE 4

In the reaction vessel, 395.8 g of purified water were charged. While nitrogen gas was blown into the vessel, the internal temperature was adjusted to 80° C.

In 348.3 g of a 40% aqueous solution of acrylamide, 4.62 g of methylene bisacrylamide and 0.9 g of 4,4'-azobis-4-cyanovaleric acid of 84% purity were dissolved. The resulting solution was added dropwise at a constant rate to the reaction vessel as in Example 4, but the reaction mixture lost its flowability in the course of the dropwise addition and at last, it gelated. The gelated polymer is designated as "C-4". It was impossible to measure the various properties of "C-4", because further dilution permitted neither dispersion nor dissolution of "C-4".

Compositions and various properties of the polymers "A-1" to "A-5" and "C-1" to "C-4", which have been obtained in Examples 1–5 and Comparative Examples 1–4, respectively are presented in Tables 1 and 2.

TABLE 1

| | Composition (mole %) | | | Polymerization initiator[1] | Polymer |
|---|---|---|---|---|---|
| | AM | SMS | MBA | (g/mole) | No. |
| Example 1 | 99.7 | 0.2 | 0.1 | 0.09 | A-1 |
| Example 2 | 99.35 | 0.25 | 0.4 | 0.45 | A-2 |
| Example 3 | 98.6 | 1.3 | 0.1 | 0.10 | A-3 |
| Example 4 | 97.13 | 2.77 | 0.1 | 0.10 | A-4 |
| Example 5 | 95.5 | 3.0 | 1.5 | 0.45 | A-5 |
| Comp. Ex. 1 | 100 | | | 0.45 | C-1 |
| Comp. Ex. 2 | 99.9 | | 0.1 | 0.09 | C-2 |
| Comp. Ex. 3 | 99.9 | | 0.1 | 0.45 | C-3 |
| Comp. Ex. 4 | 98.5 | | 0.5 | 0.45 | C-4 |

AM: Acrylamide
SMS: Sodium methallylsulfonate
MBA: Methylene bisacrylamide
[1]: 4,4'-Azobis-4-cyanovaleric acid

TABLE 2

| Polymer | Viscosity 15% Product (cps/25° C.) | Viscosity 10% Product (cps/25° C.) | Weight-average molecular weight (a) (×10,000) | Weight-average root mean square radius (b) (nm) | (b)/(a) | Number-average molecular weights (c) (×10,000) | (a)/(c) | Percentage of molecular weights of 1,000,000 and higher (%) | Hydrated diameter (nm) |
|---|---|---|---|---|---|---|---|---|---|
| A-1 | 18000 | 1780 | 305 | 73.8 | 0.0000242 | 125 | 2.44 | 73.5 | 120 |
| A-2 | 2170 | 330 | 339 | 80.2 | 0.0000237 | 88.0 | 3.85 | 74.0 | 170 |
| A-3 | 630 | 170 | 312 | 72.2 | 0.0000231 | 113 | 2.76 | 71.8 | 240 |
| A-4 | 550 | 150 | 315 | 77.0 | 0.0000244 | 105 | 3.00 | 66.7 | 170 |
| A-5 | 106 | 38 | 206 | 61.5 | 0.0000299 | 51.3 | 4.02 | 41.4 | 93 |
| C-1 | 30000 | 2820 | 69.4 | 35.2 | 0.0000507 | 32.2 | 2.16 | 18.9 | 37 |
| C-2 | Gelated | | | | | | | | |
| C-3 | 15000 | 1400 | 64.9 | 30.1 | 0.0000464 | 27.8 | 2.33 | 18.4 | 28 |
| C-4 | Gelated | | | | | | | | |

TABLE 2-continued

| Polymer | Viscosity 15% Product (cps/25° C.) | Viscosity 10% Product (cps/25° C.) | Weight-average molecular weight (a) (×10,000) | Weight-average root mean square radius (b) (nm) | (b)(a) | Number-average molecular weights (c) (×10,000) | (a)(c) | Percentage of molecular weights of 1,000,000 and higher (%) | Hydrated diameter (nm) |
|---|---|---|---|---|---|---|---|---|---|

Hydrated diameters of "C-1" and "C-3" are practically unmeasurable, because each of the polymers had a scattering strength (counter number) of 50,000 or smaller when measured by the N4-type analyzer of Coulter Inc. In the above table, values at scattering strength of 50000 or smaller are shown for reference although they are inherently unmeasurable.

EXAMPLE 6

In the reaction vessel, 600 g of purified water were charged. While nitrogen gas was blown into the vessel, the internal temperature was adjusted to 80° C.

In 332.8 g of a 40% aqueous solution of acrylamide, 0.308 g of methylene bisacrylamide, 0.79 g of sodium methallylsulfonate, 12.6 g of N,N-dimethylaminoethyl methacrylate and 5.2 g of itaconic acid were mixed and dissolved. The resulting solution was adjusted to pH 4.2 with 35% HCl.

Also prepared were 60 g of an aqueous solution in which 0.16 g of 4,4'-azobis-4-cyanovaleric acid of 84% purity was dissolved.

Both the solutions were added dropwise to the reaction vessel at constant rates over 150 minutes, respectively. In the course of the dropwise addition, the internal temperature of the reaction vessel was maintained at 80° C. After the completion of the dropwise addition, polymerization was continued for 3 hours at 80° C. The reaction vessel was then cooled to terminate the reaction. Water was added to the resulting polymer for the adjustment of a nonvolatile content, thereby obtaining the aqueous solution of an acrylamide polymer having a Brookfield viscosity at 25° C. of 5,000 cps when the solution had a nonvolatile content of 15% and a Brookfield viscosity at 25° C. of 960 cps when the solution had a nonvolatile content of 10%. The polymer so obtained is designated as "A-6". Various physical properties of "A-6" were measured as in Example 1.

EXAMPLE 7

In the reaction vessel, 660 g of purified water were charged. While nitrogen gas was blown into the vessel, the internal temperature was adjusted to 80° C.

In 331.8 g of a 40% aqueous solution of acrylamide, 1.23 g of methylene bisacrylamide, 0.79 g of sodium methallylsulfonate, 12.6 g of N,N-dimethylaminoethyl methacrylate, 5.2 g of itaconic acid and 0.9 g of 4,4'-azobis-4-cyanovaleric acid of 84% purity were mixed and dissolved. The resulting solution was subjected to pH adjustment with 35% HCl, whereby a mixed monomer-initiator solution of pH 4.2 was obtained.

The mixed monomer-initiator solution so obtained was added dropwise to the reaction vessel at a constant rate over 150 minutes, respectively. In the course of the dropwise addition, the internal temperature of the reaction vessel was maintained at 80° C. The temperature of the mixed monomer-initiator solution was maintained at 20° C. or lower so that the polymerization did not occur before the dropwise addition.

After the completion of the dropwise addition, polymerization was continued for 3 hours at 80° C. The reaction vessel was then cooled to terminate the reaction. Water was added to the resulting polymer for the adjustment of a nonvolatile content, thereby obtaining an aqueous solution of an acrylamide polymer having a Brookfield viscosity at 25° C. of 3,000 cps when the solution had a nonvolatile content of 15% and a Brookfield viscosity at 25° C. of 620 cps when the solution had a nonvolatile content of 10%. The polymer so obtained is designated as "A-7". Various physical properties of "A-7" were measured as in Example 1.

EXAMPLE 8

In the reaction vessel, 580 g of purified water were charged. While nitrogen gas was blown into the vessel, the internal temperature was adjusted to 80° C.

In 325.7 g of a 40% aqueous solution of acrylamide, 0.308 g of methylene bisacrylamide, 0.79 g of sodium methallylsulfonate, 12.5 g of N,N-dimethylaminopropyl acrylamide and 7.2 g of 80% acrylic acid were mixed and dissolved. The resulting solution was adjusted to pH 4.2 with 35% HCl.

Also prepared were 60 g of an aqueous solution in which 0.16 g of 4,4'-azobis-4-cyanovaleric acid of 84% purity was dissolved.

Both the solutions were added dropwise to the reaction vessel at constant rates over 150 minutes, respectively. In the course of the dropwise addition, the internal temperature of the reaction vessel was maintained at 80° C. After the completion of the dropwise addition, polymerization was continued for 3 hours at 80° C. The reaction vessel was then cooled to terminate the reaction. Water was added to the resulting polymer for the adjustment of a nonvolatile content, thereby obtaining an aqueous solution of an acrylamide polymer having a Brookfield viscosity at 25° C. of 11,000 cps when the solution had a nonvolatile content of 15% and a Brookfield viscosity at 25° C. of 1980 cps when the solution had a nonvolatile content of 10%. The polymer so obtained is designated as "A-8". Various physical properties of "A-8" were measured as in Example 1.

EXAMPLE 9

In the reaction vessel, 387 g of purified water were charged. While nitrogen gas was blown into the vessel, the internal temperature was adjusted to 80° C.

In 414.6 g of a 40% aqueous solution of acrylamide, 0.385 g of methylene bisacrylamide, 2.25 g of sodium methallylsulfonate, 15.7 g of N,N-dimethylaminoethyl methacrylate and 6.5 g of itaconic acid were mixed and dissolved. The resulting solution was adjusted to pH 4.2 with 35% HCl.

Also prepared were 60 g of an aqueous solution in which 0.25 g of 4,4'-azobis-4-cyanovaleric acid of 84% purity and NaOH in a mole twice as much as the mole of the 4,4'-azobis-4-cyanovaleric acid were dissolved.

Both the solutions were added dropwise to the reaction vessel at constant rates over 150 minutes, respectively. In the course of the dropwise addition, the internal temperature of the reaction vessel was maintained at 80° C. After the completion of the dropwise addition, polymerization was continued for 3 hours at 80° C. The reaction vessel was then cooled to terminate the reaction. Water was added to the resulting polymer for the adjustment of a nonvolatile content, thereby obtaining an aqueous solution of an acrylamide polymer having a Brookfield viscosity at 25° C. of 1,500 cps when the solution had a nonvolatile content of 15% and a Brookfield viscosity at 25° C. of 340 cps when the solution had a nonvolatile content of 10%. The polymer so obtained is designated as "A-9". Various physical properties of "A-9" were measured as in Example 1.

COMPARATIVE EXAMPLE 5

In the reaction vessel, 660 g of purified water were charged. While nitrogen gas was blown into the vessel, the internal temperature was adjusted to 80° C.

In 333.7 g of a 40% aqueous solution of acrylamide, 0.308 g of methylene bisacrylamide, 12.6 g of N,N-dimethylaminoethyl methacrylate, 5.2 g of itaconic acid and 0.9 g of 4,4'-azobis-4-cyanovaleric acid of 84% purity were mixed and dissolved. The resulting solution was adjusted to pH 4.2 with 35% HCl.

The solution so adjusted was added dropwise to the reaction vessel at a constant rate over 150 minutes, respectively. In the course of the dropwise addition, the internal temperature of the reaction vessel was maintained at 80° C.

After the completion of the dropwise addition, polymerization was continued for 3 hours at 80° C. The reaction vessel was then cooled to terminate the reaction. Water was added to the resulting polymer for the adjustment of a nonvolatile content, thereby obtaining an aqueous solution of an acrylamide polymer having a Brookfield viscosity at 25° C. of 9,200 cps when the solution had a nonvolatile content of 15% and a Brookfield viscosity at 25° C. of 630 cps when the solution had a nonvolatile content of 10%. The polymer so obtained is designated as "C-5". Various physical properties of "C-5" were measured as in Example 1.

COMPARATIVE EXAMPLE 6

In the reaction vessel, 600 g of purified water were charged. While nitrogen gas was blown into the vessel, the internal temperature was adjusted to 80° C.

In 333.7 g of a 40% aqueous solution of acrylamide, 0.308 g of methylene bisacrylamide, 12.6 g of N,N-dimethylaminoethyl methacrylate and 5.2 g of itaconic acid were mixed and dissolved. The resulting solution was adjusted to pH 4.2 with 35% HCl.

Also prepared were 60 g of an aqueous solution in which 0.16 g of 4,4'-azobis-4-cyanovaleric acid of 84% purity was dissolved.

Both the solutions were added dropwise at constant rates to the reaction vessel as in Example 6, but the reaction mixture lost its flowability in the course of the dropwise addition and at last, it gelated. The gelated polymer is designated as "C-6". It was impossible to measure the various properties of "C-6" because further dilution permitted neither dispersion nor dissolution of "C-6".

COMPARATIVE EXAMPLE 7

In the reaction vessel, 333.7 g of a 40% aqueous solution of acrylamide, 0.308 g of methylene bisacrylamide, 12.6 g of N,N-dimethylaminoethyl methacrylate, 5.2 g of itaconic acid and 660 g of water were charged. After they were stirred into a solution, the solution was adjusted to pH 4.2 with 35% HCl.

The solution so adjusted in the reaction vessel was subjected to deoxidation with $N_2$ gas. After the resulting solution was heated to 45° C., the reaction vessel was lagged.

Under stirring, 1.32 g of ammonium persulfate and 0.6 g of sodium bisulfite were added to the resulting solution to initiate polymerization. Sixty minutes after, the temperature of the solution reached 80° C. The solution was then left alone at 80° C. for one hour, followed by cooling to terminate the reaction. Water was then added to the resulting polymer for the adjustment of a nonvolatile content, thereby obtaining an aqueous solution of an acrylamide polymer having a Brookfield viscosity at 25° C. of 8,700 cps when the solution had a nonvolatile content of 15% and a Brookfield viscosity at 25° C. of 1,700 cps when the solution had a nonvolatile content of 10%. The polymer so obtained is designated as "C-7". Various physical properties of "C-7" were measured as in Example 1.

COMPARATIVE EXAMPLE 8

In the reaction vessel, 660 g of purified water were charged. While nitrogen gas was blown into the vessel, the internal temperature was adjusted to 80° C.

In 332.7 g of a 40% aqueous solution of acrylamide, 1.23 g of methylene bisacrylamide, 12.6 g of N,N-dimethylaminoethyl methacrylate, 5.2 g of itaconic acid and 0.9 g of 4,4'-azobis-4-cyanovaleric acid of 84% purity were mixed and dissolved. The resulting solution was adjusted to pH 4.2 with 35% HCl.

The solution was added dropwise at a constant rate to the reaction vessel as in Example 7, but the reaction mixture lost its flowability in the course of the dropwise addition and at last, it gelated. The gelated polymer is designated as "C-8". It was impossible to measure the various properties of "C-8" because further dilution permitted neither dispersion nor dissolution of "C-8".

COMPARATIVE EXAMPLE 9

In the reaction vessel, 660 g of purified water were charged. While nitrogen gas was blown into the vessel, the internal temperature was adjusted to 80° C.

In 332.7 g of a 40% aqueous solution of acrylamide, 1.23 g of methylene bisacrylamide, 12.6 g of N,N-dimethylaminoethyl methacrylate, 5.2 g of itaconic acid, 9.85 g of allyl alcohol as a molecular weight modifier and 0.9 g of 4,4'-azobis-4-cyanovaleric acid of 84% purity were mixed and dissolved. The resulting solution was adjusted to pH 4.2 with 35% HCl.

The solution so adjusted was added dropwise to the reaction vessel at a constant rate over 150 minutes. In the course of the dropwise addition, the internal temperature of the reaction vessel was maintained at 80° C.

After the completion of the dropwise addition, polymerization was continued for 3 hours at 80° C. The reaction vessel was then cooled to terminate the reaction. Water was added to the resulting polymer for the adjustment of a nonvolatile content, thereby obtaining an aqueous solution of an acrylamide polymer having a Brookfield viscosity at 25° C. of 10,000 cps when the solution had a nonvolatile content of 15% and a Brookfield viscosity at 25° C. of 1,860 cps when the solution had a nonvolatile content of 10%. The polymer so obtained is designated as "C-9". Various physical properties of "C-9" were measured as in Example 1.

COMPARATIVE EXAMPLE 10

In the reaction vessel, 560 g of purified water were charged. While nitrogen gas was blown into the vessel, the internal temperature was adjusted to 80° C.

On the other hand, 325.7 g of a 40% aqueous solution of acrylamide, 0.308 g of methylene bisacrylamide, 2.6 g of a 25% aqueous solution of sodium vinylsulfonate, 12.5 g of N,N-dimethylaminopropyl acrylamide, 7.2 g of 80% acrylic acid and 23 g of isopropyl alcohol were stirred into a solution. The resulting solution was adjusted to pH 4.2 with 35% HCl.

Also prepared were 60 g of an aqueous solution in which 0.16 g of 4,4'-azobis-4-cyanovaleric acid of 84% purity was dissolved.

Both the solutions were added dropwise to the reaction vessel at constant rates over 150 minutes. In the course of the dropwise addition, the internal temperature of the reaction vessel was maintained at 80° C. After the completion of the dropwise addition, polymerization was continued for 3 hours at 80° C. The reaction vessel was then cooled to terminate the reaction. Water was added to the resulting polymer for the adjustment of a nonvolatile content, thereby obtaining an aqueous solution of an acrylamide polymer having a Brookfield viscosity at 25° C. of 6,800 cps when the solution had a nonvolatile content of 15% and a Brookfield viscosity at 25° C. of 1,170 cps when the solution had a nonvolatile content of 10%. The polymer so obtained is designated as "C-10". Various physical properties of "C-10" were measured as in Example 1.

Compositions and various properties of the polymers "A-6" to "A-9" and "C-5" to "C-10", which have been obtained in Examples 6–9 and Comparative Examples 5–10, respectively are presented in Tables 3 and 4.

TABLE 3

|  | Composition (mole %) | | | | | Polymerization initiator[1] (g/mole) | Polymer No. |
|---|---|---|---|---|---|---|---|
| Example 6 | AM 93.7 | DM 4 | IA 2 | SMS 0.25 | MBA 0.1 | 0.08 | A-6 |
| Example 7 | AM 93.35 | DM 4 | IA 2 | SMS 0.25 | MBA 0.4 | 0.45 | A-7 |
| Example 8 | AM 91.65 | DMAPA 4 | AA 4 | SMS 0.25 | MBA 0.1 | 0.08 | A-8 |
| Example 9 | AM 93.33 | DM 4 | IA 2 | SMS 0.57 | MBA 0.1 | 0.10 | A-9 |
| Comp. Ex. 5 | AM 93.9 | DM 4 | IA 2 |  | MBA 0.1 | 0.45 | C-5 |
| Comp. Ex. 6 | AM 93.9 | DM 4 | IA 2 |  | MBA 0.1 | 0.08 | C-6 |
| Comp. Ex. 7 | AM 93.9 | DM 4 | IA 2 |  | MBA 0.1 | Redox type | C-7 |
| Comp. Ex. 8 | AM 93.6 | DM 4 | IA 2 |  | MBA 0.4 | 0.45 | C-8 |
| Comp. Ex. 9 | AM 93.6 | DM 4 | IA 2 |  | MBA 0.4 | 0.45[2] | C-9 |
| Comp. Ex. 10 | AM 91.65 | DMAPA 4 | AA 4 | VS 0.25 | MBA 0.1 | 0.08[3] | C-10 |

DM: N,N-Dimethylaminoethyl methacrylate,
IA: Itaconic acid,
DMAPA: N,N-Dimethylaminopropyl acrylamide,
AA: Acrylic acid,
VS: Sodium vinylsulfonate
[1] 4,4'-Azobis-4-cyanovaleric acid
[2] Allyl alcohol was used.
[3] Isopropyl alcohol was used.

TABLE 4

| Polymer | Viscosity 15% Product (cps/25° C.) | Viscosity 10% Product (cps/25° C.) | Weight-average molecular weight (a) (×10,000) | Weight-average root mean square radius (b) (nm) | (b)/(a) | Number-average molecular weights (c) (×10,000) | (a)/(c) | Percentage of molecular weights of 1,000,000 and higher (%) | Hydrated diameter (nm) |
|---|---|---|---|---|---|---|---|---|---|
| A-6 | 5000 | 960 | 359 | 94.6 | 0.0000264 | 131 | 2.74 | 74.5 | 140 |
| A-7 | 3000 | 620 | 407 | 93.1 | 0.0000229 | 104 | 3.91 | 65.2 | 200 |
| A-8 | 11000 | 1980 | 340 | 90.6 | 0.0000266 | 123 | 2.76 | 73.0 | 150 |
| A-9 | 1500 | 340 | 292 | 75.0 | 0.0000257 | 101 | 2.89 | 65.7 | 140 |
| C-5 | 9200 | 1630 | 84.5 | 38.8 | 0.0000459 | 36.9 | 2.29 | 27.8 | 86 |
| C-6 | Gelated | | | | | | | | |
| C-7 | 8700 | 1700 | 91.0 | 49.9 | 0.0000548 | 39.0 | 2.33 | 26.9 | 156 |
| C-8 | Gelated | | | | | | | | |
| C-9 | 10000 | 1860 | 121 | 57.1 | 0.0000472 | 41.0 | 2.95 | 33.1 | 65 |
| C-10 | 6800 | 1170 | 90 | 43.0 | 0.0000478 | 35.0 | 2.57 | 26.4 | 78 |

Hydrated diameters of "C-5" to "C-10" are practically unmeasurable, because each of the polymers had a scattering strength (counter number) of 50,000 or smaller as measured by the N4-type analyzer of Coulter Inc. In the above table, values at the scattering strength of 50000 or smaller are shown for reference although they are inherently unmeasurable.

Application examples will be described next. In each case, the polymer obtained in each of the Examples and Comparative Examples was utilized as an internal paper strength agent.

APPLICATION EXAMPLE 1

To a 1% slurry of L-BKP which had a beating degree of 400 ml in terms of CSF (Canadian Standard Freeness), aluminum sulfate was added in an amount of 0.5% based on the amount of the pulp, followed by stirring for 3 minutes. The pulp slurry at that time had pH of 6.0. Under stirring, a 1% aqueous solution of Polymer "A-6" was added in an amount of 0.5% based on the amount of the pulp on a nonvolatile basis. Stirring was continued further for 3 minutes. Using the pulp slurry so obtained, freeness was measured (JIS-P8112) and paper was formed by a TAPPI square sheet machine. The wet sheet so obtained was dried at 110° C. for 3 minutes in a drum drier, whereby a hand-made paper of 100 g/m$^2$ in basis weight was obtained. The paper so dried was subjected to moisture conditioning for at least 24 hours in an air-conditioned chamber of 20° C. and RH 65%, followed by measurement of burst index (JIS-P8112) and internal bond strength (JAPAN TAPPI54). Polymers "A-7"–"A-9", "C-5", "C-7", "C-9" and "C-10" were processed likewise. The results are shown in Table 5.

TABLE 5

| | Polymer | Freeness (ml) | Burst index | Internal bond strength (kg · cm) |
|---|---|---|---|---|
| | Not added | 420 | 3.30 | 3.15 |
| Example | A-6 | 460 | 4.44 | 5.90 |
| | A-7 | 480 | 4.50 | 6.00 |
| | A-8 | 455 | 4.40 | 5.91 |
| | A-9 | 450 | 4.35 | 5.88 |
| Comparative | C-5 | 430 | 3.90 | 4.20 |
| Example | C-7 | 445 | 3.88 | 4.50 |
| | C-9 | 440 | 3.87 | 4.44 |
| | C-10 | 440 | 3.94 | 4.30 |

It is evident that each acrylamide polymer according to the present invention has physical properties and a structure as shown in Tables 2 and 4. In some of the comparative examples, an acrylamide polymer was prepared by the prior art technique. Any polymerization process according to the prior art technique cannot provide a polymer having such a novel structure and excellent physical properties.

As shown in application examples (Table 5), the acrylamide polymers of the present invention hence have an excellent paper strength producing effect, which is not available from the conventional art.

EXAMPLE 10

In the reaction vessel, 306 g of purified water were charged. While nitrogen gas was blown into the vessel, the internal temperature was adjusted to 80° C.

On the other hand, a solution of 0.31 g of methylene bisacrylamide and 1.58 g of sodium methallylsulfonate in 283 g of a 50% aqueous solution of acrylamide and 60 g of an aqueous solution in which 0.24 g of 4,4'-azobis-4-cyanovaleric acid of 84% purity had been dissolved were prepared. Both the solutions were added dropwise to the reaction vessel at constant rates over 150 minutes. In the course of the dropwise addition, the internal temperature of the reaction vessel was kept at 80° C. After the completion of the dropwise addition, polymerization was continued for 3 hours at 80° C. The reaction vessel was then cooled to terminate the reaction, thereby obtaining an aqueous solution of an acrylamide polymer having a Brookfield viscosity at 25° C. of 12,000 cps. The polymer so obtained is designated as "A-10". In an aluminum cup whose weight was already known, 1 g of "A-10" was weighed precisely. The polymer was diluted with about 1 g of purified water, followed by drying for three hours by a hot-air drier of 105° C. to determine its oven-dry polymer concentration. It was found to be 23.8%. Further, as a result of the measurement of the weight-average molecular weight of "A-10" in accordance with the method described above, it was found to be 1,760,000.

EXAMPLE 11

In the reaction vessel, 288 g of purified water were charged. While nitrogen gas was blown into the vessel, the internal temperature was adjusted to 80° C.

In 283 g of a 50% aqueous solution of acrylamide, 0.31 g of methylene bisacrylamide, 1.58 g of sodium methallylsulfonate and 0.24 g of 4,4'-azobis-4-cyanovaleric acid of 84% purity were mixed and dissolved, whereby a mixed monomer-initiator solution was prepared.

The mixed monomer-initiator solution so obtained was added dropwise to the reaction vessel at constant rates over 150 minutes. In the course of the dropwise addition, the internal temperature of the reaction vessel was kept at 80° C. The temperature of the mixed monomer-initiator solution was maintained at 15°–25° C. as a precaution for avoiding polymerization or precipitation of the monomers before the dropwise addition. Whether polymerization of the mixed monomer-initiator solution had occurred before the dropwise addition or not was confirmed by leaving the mixed solution alone for 2 hours and then adding it into methanol.

After the completion of the dropwise addition, polymerization was continued for 3 hours at 80° C. The reaction vessel was then cooled to terminate the reaction, thereby obtaining an aqueous solution of an acrylamide polymer having a Brookfield viscosity at 25° C. of 3,340 cps. The polymer so obtained is designated as "A-11". Various physical properties of "A-11" were measured as in Example 1.

EXAMPLE 12

In the reaction vessel, 293 g of purified water were charged. While nitrogen gas was blown into the reaction vessel, the internal temperature was adjusted to 80° C.

In 2823 g of a 50% aqueous solution of acrylamide, 0.31 g of methylene bisacrylamide, 3.18 g of sodium methallylsulfonate and 0.25 g of 2,2'-azobis-2-methyl-N-(2-hydroxyethyl)-propionamide were mixed and dissolved to prepare a mixed monomer-initiator solution. The solution so obtained was added dropwise to the reaction vessel at a constant rate over 150 minutes. In the course of the dropwise addition, the internal temperature of the reaction vessel was kept at 80° C. The temperature of the mixed monomer-initiator solution was maintained at 15°–25° C.

After the completion of the dropwise addition, polymerization was continued for 3 hours at 80° C. The reaction vessel was then cooled to terminate the reaction, thereby obtaining an aqueous solution of an acrylamide polymer having a Brookfield viscosity at 25° C. of 3,700 cps. The polymer so obtained is designated as "A-12". Various physical properties of "A-12" were measured as in Example 1.

EXAMPLE 13

In the reaction vessel, 296 g of purified water were charged. While nitrogen gas was blown into the reaction vessel, the internal temperature was adjusted to 80° C.

In 421 g of a 50% aqueous solution of acrylamide, 0.46 g Of methylene bisacrylamide, 6.22 g of sodium methallylsulfonate and 0.36 g of 4,4'-azobis-4-cyanovaleric acid of 84% purity were mixed and dissolved, whereby a mixed monomer-initiator solution was prepared. The resulting solution was then added dropwise to the reaction vessel at a constant rate over 150 minutes. In the course of the dropwise addition, the internal temperature of the reaction vessel was kept at 80° C. The temperature of the mixed monomer-initiator solution was maintained at 15°–25° C.

After the completion of the dropwise addition, polymerization was continued for 3 hours at 80° C. The reaction vessel was then cooled to terminate the reaction, thereby obtaining an aqueous solution of an acrylamide polymer having a Brookfield viscosity at 25° C. of 20,000 cps. The polymer so obtained is designated as "A-13". Various physical properties of "A-13" were measured as in Example 1.

EXAMPLE 14

In the reaction vessel, 325 g of purified water were charged. While nitrogen gas was blown into the reaction vessel, the internal temperature was adjusted to 80° C.

In 550 g of a 50% aqueous solution of acrylamide, 14.4 g of methylene bisacrylamide, 111 g of sodium methallylsulfonate and 0.93 g of 4,4'-azobis-4-cyanovaleric acid of 84% purity were mixed and dissolved, whereby a mixed monomer-initiator solution was prepared.

The mixed monomer-initiator solution so obtained was added dropwise to the reaction vessel at a constant rate over 150 minutes. In the course of the dropwise addition, the internal temperature of the reaction vessel was kept at 80° C. The temperature of the mixed monomer-initiator solution was maintained at 15°–25° C.

After the completion of the dropwise addition, polymerization was continued for 3 hours at 80° C. The reaction vessel was then cooled to terminate the reaction, thereby obtaining an aqueous solution of an acrylamide polymer having a Brookfield viscosity at 25° C. of 1,070 cps. The polymer so obtained is designated as "A-14". Various physical properties of "A-14" were measured as in Example 1.

EXAMPLE 15

In the reaction vessel, 203 g of purified water were charged. While nitrogen gas was blown into the reaction vessel, the internal temperature was adjusted to 80° C.

In 747 g of a 60% aqueous solution of acrylamide, 1.02 g of methylene bisacrylamide, 52.8 g of sodium methallylsulfonate and 0.66 g of 4,4'-azobis-4-cyanovaleric acid of 84% purity were mixed and dissolved, whereby a mixed monomer-initiator solution was prepared.

The mixed monomer-initiator solution so obtained was added dropwise to the reaction vessel at a constant rate over 150 minutes. In the course of the dropwise addition, the internal temperature of the reaction vessel was kept at 80° C. and the temperature of the mixed monomer-initiator solution was maintained at 15°–25° C.

After the completion of the dropwise addition, polymerization was continued for 3 hours at 80° C. The reaction vessel was then cooled to terminate the reaction, thereby obtaining an aqueous solution of an acrylamide polymer having a Brookfield viscosity at 25° C. of 47,600 cps. The polymer so obtained is designated as "A-15". Various physical properties of "A-15" were measured as in Example 1.

COMPARATIVE EXAMPLE 11

In the reaction vessel, 363 g of purified water were charged. While nitrogen gas was blown into the reaction vessel, the internal temperature was adjusted to 80° C.

In 284 g of a 50% aqueous solution of acrylamide, 0.31 g of methylene bisacrylamide and 0.24 g of 4,4'-azobis-4-cyanovaleric acid of 84% purity were mixed and dissolved. The resulting aqueous solution was added dropwise to the reaction vessel at a constant rate over 150 minutes. In the course of the dropwise addition, the internal temperature of the reaction vessel was maintained at 80° C. and the temperature of the mixed solution was maintained at 15–25° C. In the course of the dropwise addition, however, the reaction mixture became highly viscous, lost its flowability and finally gelated. The gelated polymer is designated as "C-11". It was impossible to measure the various properties of "C-11" because further dilution with water permitted neither dispersion nor dissolution of "C-11".

COMPARATIVE EXAMPLE 12

In the reaction vessel, 228 g of purified water were charged. While nitrogen gas was blown into the reaction vessel, the internal temperature was adjusted to 80° C.

A solution in which 283 g of a 50% aqueous solution of acrylamide, 0.31 g of methylene bisacrylamide and 30 g of isopropyl alcohol had been mixed and 60 g of an aqueous solution of 0.24 g of 4,4'-azobis-4-cyanovaleric acid of 84% purity were added dropwise to the reaction vessel at constant rates over 150 minutes, respectively. In the course of the dropwise addition, the internal temperature of the reaction vessel was kept at 80° C. After the completion of the dropwise addition, polymerization was continued for 3 hours at 80° C. The reaction vessel was then cooled to terminate the reaction, thereby obtaining an aqueous solution of an acrylamide polymer having a Brookfield viscosity at 25° C. of 13,300 cps. The polymer so obtained is designated as "C-12". Various physical properties of "C-12" were measured as in Example 1.

the dropwise addition, the internal temperature of the reaction vessel was maintained at 80° C. and the temperature of the mixed solution was maintained at 15–25° C. In the course of the dropwise addition, however, the reaction mixture became highly viscous, lost its flowability and finally gelated. The gelated polymer is designated as "C-14". It was impossible to measure the various properties of "C-14" because further dilution with water permitted neither dispersion nor dissolution of "C-14".

Compositions and various properties of the polymers "A-10" to "A-15" and "C-11" to "C-14", which have been obtained in Examples 10–15 and Comparative Examples 11–14, respectively are presented in Table 6.

TABLE 6

|  | Examples | | | | | | Comparative Examples | | | |
| --- | --- | --- | --- | --- | --- | --- | --- | --- | --- | --- |
|  | 10 | 11 | 12 | 13 | 14 | 15 | 11 | 12 | 13 | 14 |
| AM (mole %) | 99.4 | 99.4 | 98.9 | 98.6 | 83 | 94.9 | 99.9 | 99.9 | 98.0 | 99.9 |
| MBA (mole %) | 0.1 | 0.1 | 0.1 | 0.1 | 2.0 | 0.1 | 0.1 | 0.1 | 2.0 | 0.1 |
| SMS (mole %) | 0.5 | 0.5 | 1.0 | 1.3 | 15.0 | 5.0 | 0 | 0 | 0 | 0 |
| Initiator[1] | A | A | B | A | A | A | A | A | A | A |
| Amount g/M[2] | 0.1 | 0.1 | 0.12 | 0.1 | 0.2 | 0.1 | 0.1 | 0.1 | 0.3 | 0.1 |
| DPC[3] (%) | 23.8 | 27.4 | 27.4 | 31.9 | 43.1 | 53.9 | — | 25.6 | — | — |
| Viscosity (ps) | 120 | 33.4 | 37.7 | 200 | 10.7 | 476 | Gel | 133 | Gel | Gel |
| Mw[4] (×10,000) | 176 | 90.5 | 130 | 312 | 77.3 | 62 | — | 36.6 | — | — |

[1]Initiator
A: 4,4'-Aazobis-4-cyanovaleric acid
B: 2,2'-Azobis-2-methyl-N-(2-hydroxyethyl)-propionamide
[2]Amount of the initiator: gram number per mole of the monomer(s) employed
[3]DPC: Oven-dry polymer concentration
[4]Mw: Weight-average molecular weight

COMPARATIVE EXAMPLE 13

In the reaction vessel, 217 g of purified water were charged. While nitrogen gas was blown into the reaction vessel, the internal temperature was adjusted to 80° C.

In 766 g of a 50% aqueous solution of acrylamide, 17.0 g of methylene bisacrylamide and 1.96 g of 4,4'-azobis-4-cyanovaleric acid of 84% purity were mixed and dissolved, whereby a mixed monomer-initiator solution was obtained. The resulting solution was added dropwise to the reaction vessel at a constant rate over 150 minutes. In the course of the dropwise addition, the internal temperature of the reaction vessel was maintained at 80° C. and the temperature of the mixed solution was maintained at 15°–25° C. In the course of the dropwise addition, however, the reaction mixture became highly viscous, lost its flowability and finally gelated. The gelated polymer is designated as "C-13". It was impossible to measure the various properties of "C-13" because further dilution with water permitted neither dispersion nor dissolution of "C-13".

COMPARATIVE EXAMPLE 14

In the reaction vessel, 167 g of purified water were charged. While nitrogen gas was blown into the reaction vessel, the internal temperature was adjusted to 80° C.

In 8312 g of a 60% aqueous solution of acrylamide, 1.1 g of methylene bisacrylamide and 0.84 g of 4,4'-azobis-4-cyanovaleric acid of 84% purity were mixed and dissolved, whereby a mixed monomer-initiator solution was obtained. The resulting solution was added dropwise to the reaction vessel at a constant rate over 150 minutes. In the course of

EXAMPLE 16

In the reaction vessel, 355 g of purified water were charged. While nitrogen gas was blown into the vessel, the internal temperature was adjusted to 80° C.

In 263 g of a 50% aqueous solution of acrylamide, 0.25 g of methylene bisacrylamide, 1.49 g of sodium methallylsulfonate, 15.7 g of N,N-dimethylaminoethyl methacrylate and 5.2 g of itaconic acid were mixed and dissolved. The resulting solution was adjusted to pH 4.2 with 35% HCl.

Also prepared were 60 g of an aqueous solution in which 0.24 g of 4,4'-azobis-4-cyanovaleric acid of 84% purity was dissolved.

Both the solutions were added dropwise to the reaction vessel at constant rates over 150 minutes, respectively. In the course of the dropwise addition, the internal temperature of the reaction vessel was maintained at 80° C. After the completion of the dropwise addition, polymerization was continued for 3 hours at 80° C. The reaction vessel was then cooled to terminate the reaction, thereby obtaining the aqueous solution of an acrylamide polymer having a Brookfield viscosity at 25° C. of 8,950 cps. The polymer so obtained is designated as "A-16". Various physical properties of "A-16" were measured as in Example 1.

EXAMPLE 17

In the reaction vessel, 286 g of purified water were charged. While nitrogen gas was blown into the flask, the internal temperature was adjusted to 80° C.

In 394 g of a 50% aqueous solution of acrylamide, 0.46 g of methylene bisacrylamide, 6.30 g of sodium methallylsulfonate, 18.8 g of N,N-dimethylaminopropyl acrylamide, 5.94 g of itaconic acid and 5.48 g of acrylic acid were mixed and dissolved. The resulting solution was adjusted to pH 4.2 with 35% HCl.

Also prepared were 60 g of an aqueous solution in which 0.36 g of 4,4'-azobis-4-cyanovaleric acid of 84% purity was dissolved.

Both the solutions were added dropwise to the reaction vessel at constant rates over 150 minutes, respectively. In the course of the dropwise addition, the internal temperature of the reaction vessel was maintained at 80° C. After the completion of the dropwise addition, polymerization was continued for 3 hours at 80° C. The reaction vessel was then cooled to terminate the reaction, thereby obtaining the aqueous solution of an acrylamide polymer having a Brookfield viscosity at 25° C. of 12,000 cps. The polymer so obtained is designated as "A-17". Various physical properties of "A-17" were measured as in Example 1.

EXAMPLE 18

In the reaction vessel, 173 g of purified water were charged. While nitrogen gas was blown into the flask, the internal temperature was adjusted to 80° C.

In 730 g of a 50% aqueous solution of acrylamide, 1.67 g of methylene bisacrylamide, 25.7 g of sodium methallylsulfonate and 9.75 g of acrylic acid were mixed and dissolved. The resulting solution was adjusted to pH 4.2 with 40% sulfuric acid.

Also prepared were 60 g of an aqueous solution in which 1.08 g of 2,2'-azobis-2-methylpropionamidine hydrochloride were dissolved.

Both the solutions were added dropwise to the reaction vessel at constant rates over 150 minutes, respectively. In the course of the dropwise addition, the internal temperature of the reaction vessel was maintained at 80° C. After the completion of the dropwise addition, polymerization was continued for 3 hours at 80° C. The reaction vessel was then cooled to terminate the reaction, thereby obtaining the aqueous solution of an acrylamide polymer having a Brookfield viscosity at 25° C. of 25,500 cps. The polymer so obtained is designated as "A-18". Various physical properties of "A-18" were measured as in Example 1.

COMPARATIVE EXAMPLE 15

In the reaction vessel, 409 g of purified water, 263 g of a 50% aqueous solution of acrylamide, 0.19 g of methylene bisacrylamide, 15.7 g of N,N-dimethylaminoethyl methacrylate and 5.21 g of itaconic acid were charged. After they were stirred into a solution, the solution was adjusted to pH 4.2 with 35% HCl. The solution so adjusted was heated to 35° C., followed by the addition of 1.0 g of 2,2'-azobis-2-(2-imidazolin-2-yl)propane hydrochloride. Twenty minutes after the addition, the initiation of the polymerization was confirmed. Twenty minutes after the initiation, the internal temperature of the reaction vessel reached 90° C. The polymerization was continued for 2 hours at that temperature. The reaction vessel was then cooled to terminate the reaction, thereby obtaining the aqueous solution of an acrylamide polymer having a Brookfield viscosity at 25° C. of 46,100 cps. The polymer so obtained is designated as "C-15". Various physical properties of "C-15" were measured as in Example 1.

COMPARATIVE EXAMPLE 16

In the reaction vessel, 278 g of purified water were charged. While nitrogen gas was blown into the vessel, the internal temperature was adjusted to 80° C.

In 397 g of a 50% aqueous solution of acrylamide, 0.31 g of methylene bisacrylamide, 23.5 g of N,N-dimethylaminoethyl methacrylate and 7.8 g of itaconic acid were mixed and dissolved. The resulting solution was adjusted to pH 4.2 with 35% HCl.

Also prepared were 60 g of an aqueous solution in which 1.07 g of 4,4'-azobis-4-cyanovaleric acid of 84% purity were dissolved.

Both the solutions were added dropwise at constant rates to the reaction vessel as in Example 10, but the reaction mixture lost its flowability in the course of the dropwise addition and at last, it gelated. The gelated polymer is designated as "C-16". It was impossible to measure the various properties of "C-16" because further dilution permitted neither dispersion nor dissolution of "C-16".

COMPARATIVE EXAMPLE 17

In the reaction vessel, 330 g of purified water were charged. While nitrogen gas was blown into the vessel, the internal temperature was adjusted to 80° C.

On the other hand, 397 g of a 50% aqueous solution of acrylamide, 21.4 g of N,N-dimethylaminoethyl methacrylate, 8.85 g of itaconic acid and, as a molecular weight modifier, 23.7 g of allyl alcohol were stirred into a solution. The resulting solution was adjusted to pH 4.2 with 35% HCl.

Also prepared were 60 g of an aqueous solution in which 0.9 g of 4,4'-azobis-4-cyanovaleric acid of 84% purity was dissolved.

Both the solutions were added dropwise to the reaction vessel at constant rates for 150 minutes. IN the course of the dropwise addition, the internal temperature of the reaction vessel was maintained at 80° C. After the completion of the dropwise addition, polymerization was continued at 80° C. for three hours. The reaction vessel was then cooled to terminate the reaction, thereby obtaining an aqueous solution of an acrylamide polymer having a Brookfield viscosity at 25° C. of 3,890 cps. The polymer so obtained is designated as "C-17". Various physical properties of "C-17" were measured as in Example 1.

Compositions and various properties of the polymers "A-16" to "A-18" and "C-15" to "C-17" which have been obtained in Examples 16–18 and Comparative Examples 15–17, respectively are presented in Table 7.

TABLE 7

|  | Examples | | | Comp. Ex. | | |
| --- | --- | --- | --- | --- | --- | --- |
|  | 16 | 17 | 18 | 15 | 16 | 17 |
| AM (mole %) | 92.5 | 91.1 | 94.8 | 92.4 | 92.9 | 94.0 |
| MBA (mole %) | 0.08 | 0.1 | 0.2 | 0.06 | 0.1 | 0 |
| SMS (mole %) | 0.47 | 1.33 | 3.0 | 0 | 0 | 0 |
| DM (mole %) | 5 | 4 | — | 5 | 5 | 4 |
| IA (mole %) | 2 | 1.5 | — | 2 | 2 | 2 |
| AA[1)] (mole %) | 0 | 2 | 2 | 0 | 0 | 0 |
| Initiator[2)] | A | A | C | D | A | A |
| (Amount g/M[3)]) | 0.1 | 0.1 | 0.2 | 0.5 | 0.3 | 0.22 |
| DPC (%) | 22.1 | 33.2 | 43.9 | 23.9 | — | 31.1 |
| Viscosity (ps) | 89.5 | 120 | 255 | 461 | GEL | 38.9 |
| Mw (×10,000) | 320 | 264 | 184 | 41.0 | — | 16.0 |

[1)]AA: Acrylic acid
[2)]Initiator
C: 2,2'-azobis-2-methylpropionamidine hydrochloride
D: 2,2'-azobis-2-(2-imidazolin-2-yl)propane hydrochloride
[3)]Amount of the initiator: gram number per mole of the monomer(s) employed
Refer to Table 6 concerning other abbreviations.

Application Examples 2–3, Comparative Application Examples 1–2

To a 1% slurry of L-BKP having CSF of 400 ml, aluminum sulfate was added in an amount of 0.5% based on the amount of the pulp, followed by stirring for 3 minutes. The pulp slurry at that time had pH of 6.0. Under stirring, a 1% aqueous solution of Polymer "A-16" was added in an amount of 0.5% based on the amount of the pulp on a nonvolatile basis. Stirring was continued further for 3 minutes. Using the pulp slurry so obtained, freeness was measured (JIS-P8121) and paper was made by a TAPPI square sheet machine. The wet sheet so obtained was dried at 110° C. for 3 minutes in a drum drier, whereby a hand-made paper of 100 g/m$^2$ in basis weight was obtained. The paper so dried was subjected to moisture conditioning for at least 24 hours in an air-conditioned chamber of 20° C. and RH 65%, followed by measurement of burst index (JIS-P8112) and internal bond strength (internal bond tester, manufactured by Kumagawa Rikikogyo Co., Ltd.). Polymers "A-17, "C-15" and "C-17" were processed likewise. The results are shown in Table 8.

TABLE 8

|  | Polymer | Burst index (kgf/cm$^2$) | Freeness (ml) | Internal bond strength (kg – cm) |
| --- | --- | --- | --- | --- |
|  | Not added | 3.31 | 415 | 3.12 |
| Application Example 2 | A-7 | 4.21 | 465 | 5.83 |
| Application Example 3 | A-8 | 4.33 | 460 | 5.76 |
| Comparative Application Example 1 | C-5 | 3.89 | 430 | 4.14 |
| Comparative Application Example 2 | C-7 | 3.99 | 440 | 4.23 |

Each aqueous solution of an acrylamide polymer according to the present invention is, as shown in Example 10 et seq., an aqueous polymer solution of low viscosity, although the concentration and molecular weight of the polymer are so high that no conventional art has ever achieved. Such a high concentration makes it possible to save the shipment cost when considered in terms of the solid content. The polymer is therefore economically excellent. When this polymer is used as a paper strength agent, it can exhibit comparable or better performance compared with conventional paper strength agents and is evidently excellent.

EXAMPLE 19

In a four-necked 1-l separable flask equipped with a stirrer, a thermometer, a reflux condenser and a nitrogen inlet tube, 330 g of 40% acrylamide, 1 g of sodium methallylsulfonate, 0.5 g of methylene bisacrylamide and 558 g of tap water were charged, followed by pH adjustment to 4.2. While the flask was purged with nitrogen, its temperature was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 7,400 cps and pH Of 4.2. The absolute weight average molecular weight of the resulting polymer determined by the method described above was 2,400,000. The polymer is designated as "A".

EXAMPLE 20

In the same separable flask employed in Example 19, 330 g of 40% acrylamide, 14 g of dimethylaminoethyl methacrylate, 1 g of sodium methallylsulfonate, 0.5 g of methylene bisacrylamide and 615 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 7,000 cps and pH of 4.2. The absolute weight average molecular weight of the resulting polymer determined by the method described above was 2,500,000. The polymer is designated as "B".

EXAMPLE 21

In the separable flask, 330 g of 40% acrylamide, 16 g of dimethylaminoethyl methacrylate, 8 g of 80% acrylic acid, 3 g of itaconic acid, 1 g of sodium methallylsulfonate, 0.5 g of methylene bisacrylamide and 669 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 5,900 cps and pH of 4.2. The absolute weight average molecular weight of the resulting polymer determined by the method described above was 2,800,000. The polymer is designated as "C".

EXAMPLE 22

In the separable flask, 330 g of 40% acrylamide, 5 g of dimethylaminoethyl methacrylate, 18 g of 80% N-metacryloyloxyethyltrimethylammonium chloride, 10 g of 80% acrylic acid, 1 g of sodium methallylsulfonate, 0.5 g of methylene bisacrylamide and 698 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 6,200 cps and pH of 4.2. The absolute weight average molecular weight of the resulting polymer determined by the method described above was 2,700,000. The polymer is designated as "D".

EXAMPLE 23

In the separable flask, 330 g of 40% acrylamide, 25 g of 80% N-metacryloyloxyethyltrimethylammonium chloride, 10 g of 80% acrylic acid, 1 g of sodium methallylsulfonate, 0.5 g of methylene bisacrylamide and 710 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 6,800 cps and pH of 4.2. The absolute weight average molecular weight of the resulting polymer determined by the method described above was 2,600,000. The polymer is designated as "E".

EXAMPLE 24

In the separable flask, 330 g of 40% acrylamide, 20 g of 80% acrylic acid, 1 g of sodium methallylsulfonate, 0.5 g of methylene bisacrylamide and 645 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 5,400 cps and pH of 4.2. The absolute weight average molecular weight of the resulting polymer determined by the method described above was 2,500,000. The polymer is designated as "F".

EXAMPLE 25

In the separable flask, 330 g of 40% acrylamide, 12 g of 80% acrylic acid, 5 g of itaconic acid, 1 g of sodium methallylsulfonate, 0.5 g of methylene bisacrylamide and 615 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 61,000 cps and pH of 4.2. The absolute weight average molecular weight of the resulting polymer determined by the method described above was 2,400,000. The polymer is designated as "G".

COMPARATIVE EXAMPLE 18

In the separable flask, 330 g of 40% acrylamide, 1 g of sodium methallylsulfonate and 555 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 8,300 cps and pH of 4.2. The absolute weight average molecular weight of the resulting polymer determined by the method described above was 700,000. The polymer is designated as "H".

COMPARATIVE EXAMPLE 19

In the separable flask, 330 g of 40% acrylamide, 0.5 g of methylene bisacrylamide and 553 g of tap water were charged, followed by pH adjustment to 4.2. While the flask was purged with nitrogen, its temperature was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 5,400 cps and pH of 4.2. The absolute weight average molecular weight of the resulting polymer determined by the method described above was 900,000. The polymer is designated as "I".

COMPARATIVE EXAMPLE 20

In the separable flask, 330 g of 40% acrylamide, 14 g of dimethylaminoethyl methacrylate, 1 g of sodium methallylsulfonate and 607 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 8,000 cps and pH of 4.2. The absolute weight average molecular weight of the resulting polymer determined by the method described above was 970,000. The polymer is designated as "J".

COMPARATIVE EXAMPLE 21

In the separable flask, 330 g of 40% acrylamide, 16 g of dimethylaminoethyl methacrylate, 8 g of 80% acrylic acid, 3 g of itaconic acid, 1 g of sodium methallylsulfonate and 659 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 6,700 cps and pH of 4.2. The absolute weight average molecular weight of the resulting polymer determined by the method described above was 810,000. The polymer is designated as "K".

COMPARATIVE EXAMPLE 22

In the separable flask, 330 g of 40% acrylamide, 5 g of dimethylaminoethyl methacrylate, 18 g of 80% N-metacryloyloxyethyltrimethylammonium chloride, 10 g of 80% acrylic acid, 1 g of sodium methallylsulfonate and 683 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 6,000 cps and pH of 4.2. The absolute weight average molecular weight of the resulting polymer determined by the method described above was 1,000,000. The polymer is designated as "L".

COMPARATIVE EXAMPLE 23

In the separable flask, 330 g of 40% acrylamide, 25 g of 80% N-metacryloyloxyethyltrimethylammonium chloride, 10 g of 80% acrylic acid, 1 g of sodium methallylsulfonate and 707 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 7,100 cps and pH of 4.2. The absolute weight average molecular weight of the resulting polymer determined by the method described above was 1,100,000. The polymer is designated as "M".

COMPARATIVE EXAMPLE 24

In the separable flask, 330 g of 40% acrylamide, 20 g of 80% acrylic acid, 1 g of sodium methallylsulfonate and 642 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 6,900 cps and pH of 4.2. The absolute weight average molecular weight of the resulting polymer determined by the method described above was 890,000. The polymer is designated as "N".

EXAMPLE 26

In the separable flask, 330 g of 40% acrylamide, 12 g of 80% acrylic acid, 5 g of itaconic acid, 1 g of sodium methallylsulfonate and 638 g of tap water were charged, followed by pH adjustment to 4.2. While the flask was purged with nitrogen, the temperature of the resulting mixture was raised to 50° C. Ammonium persulfate was then added to the resulting mixture and polymerization was conducted for 120 minutes. The flask was cooled to complete the polymerization reaction, thereby obtaining a stable, water-soluble polymer having a Brookfield viscosity at 25° C. of 73,000 cps and pH of 4.2. The absolute weight average molecular weight of the resulting polymer determined by the method described above was 880,000. The polymer is designated as "O".

Application Examples 4–10, Comparative Application Examples 3–10

To a 1% pulp slurry which was obtained from waste corrugated fiberboards and had a CSF of 420 ml, aluminum sulfate was added in an amount of 1.0% based on the amount of the pulp on a dry weight basis, followed by stirring for one minute. The pulp slurry at that time had a pH of 5.0. Incidentally, pulp slurries prepared in a similar manner except that sodium hydroxide was added in varied amounts immediately before the addition of aluminum sulfate had pHs of 5.0, 6.0 and 7.0. The paper strength agent obtained in Example 19 was added in an amount of 0.5% based on the amount of the pulp on a dry weight basis, followed by stirring for further one minute. Using a TAPPI square sheet machine, the slurry was machined into a paper. The wet sheet so machined was dried at 110° C. for 3 minutes in a drum drier, whereby a hand-made paper of 150 g/m² in basis weight was obtained as Application Example 4. The paper so dried was subjected to moisture conditioning for at least 24 hours in an air-conditioned chamber of 20° C. and RH 65%, followed by measurement of burst index (JIS-P8112), ring crush (JIS-P8126) and freeness (JIS-P8121). The results are shown in Tables 8–10.

In Application Examples 5–10 and Comparative Application Examples 3–10, papers were formed under similar conditions in a similar manner except that the paper strength agent (A) was replaced by those indicated in the table shown below, respectively. Further, their burst index, ring crush and freeness were measured and evaluated also under similar conditions and in a similar manner to Application Example 4.

TABLE 9

| | Polymer added | Burst index (kgf/cm²) | (Machined at pH 5.0) Ring crush (N · m²/g) | Freeness (ml) |
|---|---|---|---|---|
| | Not added | 3.52 | 15.3 | 420 |
| Application Example 4 | A | 4.72 | 19.4 | 445 |
| Application Example 5 | B | 4.81 | 21.0 | 465 |
| Application Example 6 | C | 4.85 | 21.4 | 465 |
| Application Example 7 | D | 4.86 | 21.0 | 470 |
| Application Example 8 | E | 4.80 | 20.6 | 480 |
| Application Example 9 | F | 4.87 | 21.6 | 480 |
| Application Example 10 | G | 4.90 | 21.6 | 475 |
| Comparative Application Example 3 | H | 4.22 | 18.1 | 430 |
| Comparative Application Example 4 | I | 4.24 | 18.3 | 440 |
| Comparative Application Example 5 | J | 4.38 | 18.5 | 440 |
| Comparative Application Example 6 | K | 4.20 | 18.2 | 440 |
| Comparative Application Example 7 | L | 4.21 | 18.0 | 430 |
| Comparative Application Example 8 | M | 4.25 | 18.6 | 420 |
| Comparative Application Example 9 | N | 4.30 | 19.0 | 440 |
| Comparative Application Example 10 | O | 4.31 | 19.1 | 435 |

TABLE 10

| | Polymer added | Burst index (kgf/cm²) | (Machined at pH 6.0) Ring crush (N · m²/g) | Freeness (ml) |
|---|---|---|---|---|
| | Not added | 3.65 | 16.0 | 425 |
| Application Example 4 | A | 4.70 | 19.5 | 450 |
| Application Example 5 | B | 4.85 | 21.3 | 465 |
| Application | C | 4.91 | 21.8 | 460 |

TABLE 10-continued

| | Polymer added | Burst index (kgf/cm²) | (Machined at pH 6.0) Ring crush (N · m²/g) | Freeness (ml) |
|---|---|---|---|---|
| Example 6 Application Example 7 | D | 4.90 | 21.5 | 465 |
| Application Example 8 | E | 4.88 | 21.0 | 475 |
| Application Example 9 | F | 4.80 | 20.2 | 470 |
| Application Example 10 | G | 4.84 | 21.0 | 465 |
| Comparative Application Example 3 | H | 4.25 | 18.2 | 420 |
| Comparative Application Example 4 | I | 4.26 | 18.3 | 430 |
| Comparative Application Example 5 | J | 4.43 | 19.0 | 440 |
| Comparative Application Example 6 | K | 4.25 | 18.9 | 430 |
| Comparative Application Example 7 | L | 4.22 | 18.5 | 425 |
| Comparative Application Example 8 | M | 4.25 | 19.0 | 425 |
| Comparative Application Example 9 | N | 4.26 | 18.6 | 450 |
| Comparative Application Example 10 | O | 4.28 | 19.4 | 445 |

TABLE 11

| | Polymer added | Burst index (kgf/cm²) | (Machined at pH 7.0) Ring crush (N · m²/g) | Freeness (ml) |
|---|---|---|---|---|
| | Not added | 3.55 | 15.1 | 420 |
| Application Example 4 | A | 4.64 | 19.1 | 445 |
| Application Example 5 | B | 4.81 | 21.0 | 455 |
| Application Example 6 | C | 4.88 | 21.3 | 460 |
| Application Example 7 | D | 4.90 | 21.6 | 460 |
| Application Example 8 | E | 4.82 | 20.6 | 460 |
| Application Example 9 | F | 4.76 | 20.0 | 450 |
| Application Example 10 | G | 4.81 | 20.7 | 455 |
| Comparative Application Example 3 | H | 3.92 | 17.2 | 425 |
| Comparative Application Example 4 | I | 3.99 | 17.9 | 430 |
| Comparative Application Example 5 | J | 4.20 | 18.9 | 425 |
| Comparative Application Example 6 | K | 4.22 | 19.4 | 430 |
| Comparative Application Example 7 | L | 4.15 | 18.0 | 430 |
| Comparative Application Example 8 | M | 4.23 | 18.7 | 430 |
| Comparative Application Example 9 | N | 3.89 | 17.6 | 440 |
| Comparative Application Example 10 | O | 3.98 | 18.4 | 435 |

As is apparent from the results shown in Tables 8–10, each paper strength agent according to the present invention is superior to the conventional ones, because it shows excellent paper strength reinforcing effects in terms of burst index, ring crush and freeness and is resistant to pH variations of a pulp slurry to be formed into paper.

What is claimed is:

1. An acrylamide polymer having (a) a weight-average molecular weight of from 1,500,000 to 10,000,000 and (b) a weight-average root mean square radius of from 30 to 150 nm, the ratio (b)/(a) of the weight-average root mean square radius to the weight-average molecular weight being 0.00004 or smaller which has been obtained by polymerizing acrylamide, methacrylamide, or one or more monomers in addition to acrylamide and/or methacrylamide; one or more of compounds and/or salts thereof, said compounds being represented by the following formula (1):

$$CH_2=C-R \qquad (1)$$
$$\quad |$$
$$(CH_2)_n-SO_3H$$

wherein R represents a hydrogen atom or a lower alkyl group and n stands for an integer of from 1 to 8 and/or salts thereof, which comprises a crosslinking monomer as a copolymer component.

2. An acrylamide polymer according to claim 1, which has (c) a number-average molecular weight of from 400,000 to 5,000,000, the ratio (a)/(c) of the weight-average molecular weight to the number-average molecular weight being 6 or smaller.

3. An acrylamide polymer according to claim 1, which comprises at least 40 wt. % of which comprises a polymer having a molecular weight of 1,000,000 or greater.

4. An acrylamide polymer according to claim 1, which has a Brookfield viscosity at 25° C. of from 20 to 10,000 cps in the form of a 10 wt. % aqueous solution or a Brookfield viscosity at 25° C. of from 100 to 30,000 cps in the form of a 15 wt. % aqueous solution.

5. An acrylamide polymer according to claim 1, which has a hydrated diameter of from 50 to 300 nm as measured by a dynamic light scattering method.

6. An acrylamide polymer according to claim 1, which comprises, as a copolymer component or copolymer components, one or more of the compounds represented by the formula (1) and/or the salts thereof.

* * * * *

UNITED STATES PATENT AND TRADEMARK OFFICE
CERTIFICATE OF CORRECTION

PATENT NO. : 5,627,249
DATED : May 6, 1997
INVENTOR(S) : Hirotoshi DOKI, et al.

It is certified that error appears in the above-indentified patent and that said Letters Patent is hereby corrected as shown below:

On the title page, item [30], Foreign Application Data, fourth priority should be:

--Jun. 21, 1994   [JP]   Japan   ...............   6-138733--

In item [75] first four inventors' residence should be: Yokohama--

Signed and Sealed this

Twelfth Day of August, 1997

Attest:

BRUCE LEHMAN

Attesting Officer

Commissioner of Patents and Trademarks